(12) United States Patent
Knop et al.

(10) Patent No.: US 10,908,403 B2
(45) Date of Patent: Feb. 2, 2021

(54) LIGHT-PAD MICROSCOPE FOR HIGH-RESOLUTION 3D FLUORESCENCE IMAGING AND 2D FLUCTUATION SPECTROSCOPY

(75) Inventors: Michael Knop, Heidelberg (DE); Malte Wachsmuth, Heidelberg (DE); Jérémie Capoulade, Heidelberg (DE)

(73) Assignee: EUROPEAN MOLECULAR BIOLOGY LABORATORY (EMBL), Heidelberg (DE)

( * ) Notice: Subject to any disclaimer, the term of this patent is extended or adjusted under 35 U.S.C. 154(b) by 1153 days.

(21) Appl. No.: 13/371,991

(22) Filed: Feb. 13, 2012

(65) Prior Publication Data

US 2012/0206798 A1  Aug. 16, 2012

Related U.S. Application Data

(60) Provisional application No. 61/442,616, filed on Feb. 14, 2011.

(51) Int. Cl.
*G02B 21/00* (2006.01)
*G02B 21/36* (2006.01)
(Continued)

(52) U.S. Cl.
CPC ....... *G02B 21/002* (2013.01); *G02B 21/0032* (2013.01); *G02B 21/06* (2013.01);
(Continued)

(58) Field of Classification Search
CPC .................... G02B 21/00–368; G01N 21/6458
(Continued)

(56) References Cited

U.S. PATENT DOCUMENTS

| 7,002,739 B2 | 2/2006 | Awamura |
| 7,554,725 B2 | 6/2009 | Stelzer et al. |

(Continued)

FOREIGN PATENT DOCUMENTS

| CN | 1300563 C | 2/2007 |
| CN | 101501549 A | 8/2009 |

(Continued)

OTHER PUBLICATIONS

U.S. Appl. No. 61/386,342, Betzig, Robert E., "Rapid subcellular 3D isotropic imaging with reduced photobleaching using Bessel beam plane illumination," specification pp. 1-52, filed on Sep. 24, 2010.*

(Continued)

*Primary Examiner* — Kimberly N. Kakalec
(74) *Attorney, Agent, or Firm* — Hultquist, PLLC; Steven I. Hultquist

(57) ABSTRACT

A microscope is described, having an illumination light path for illuminating a sample or object and a viewing light path for viewing the sample. The microscope includes an illumination light path focussing arrangement in the illumination light path, defining a substantially two-dimensional sample or object illumination region extending along an illumination direction of the illumination light path and transversely thereto. The microscope further includes an illumination region-confining device in the illumination light path for selectively illuminating a portion of the substantially two-dimensional object illumination region, wherein the portion of the substantially two-dimensional object illumination region is confined at least in the illumination direction and/or in the direction transversely thereto.

16 Claims, 10 Drawing Sheets

(51) Int. Cl.
*G02B 21/06* (2006.01)
*G02B 21/16* (2006.01)
*G01N 21/64* (2006.01)

(52) U.S. Cl.
CPC ........... *G02B 21/16* (2013.01); *G02B 21/367* (2013.01); *G01N 21/6408* (2013.01)

(58) Field of Classification Search
USPC .................................................. 359/368–395
See application file for complete search history.

(56) References Cited

U.S. PATENT DOCUMENTS

| | | | |
|---|---|---|---|
| 7,820,984 B2 | 10/2010 | Suzuki | |
| 8,254,020 B2 | 8/2012 | Holy et al. | |
| 2002/0034748 A1 | 3/2002 | Quake et al. | |
| 2006/0109563 A1* | 5/2006 | Dietrich | G02B 13/22 359/663 |
| 2006/0146325 A1* | 7/2006 | Wachsmuth et al. | 356/318 |
| 2009/0237765 A1* | 9/2009 | Lippert | G02B 21/06 359/213.1 |
| 2009/0284833 A1* | 11/2009 | Shimamoto | G02B 21/08 359/385 |
| 2010/0201784 A1* | 8/2010 | Lippert et al. | 348/46 |
| 2010/0265575 A1* | 10/2010 | Lippert et al. | 359/385 |
| 2011/0036996 A1 | 2/2011 | Wolleschensky et al. | |
| 2011/0304723 A1* | 12/2011 | Betzig | 348/79 |

FOREIGN PATENT DOCUMENTS

| | | |
|---|---|---|
| CN | 101661000 A | 3/2010 |
| JP | 9-210909 A | 8/1997 |
| JP | 11-326616 A | 11/1999 |
| JP | 2004-302441 A | 10/2004 |
| JP | 2005-62421 A | 3/2005 |
| JP | 2006-509246 A | 3/2006 |
| JP | 2007-225874 A | 9/2007 |
| JP | 2008250303 A | 10/2008 |
| JP | 2009-156659 A | 7/2009 |
| JP | 2010-72014 A | 4/2010 |
| JP | 2010-72015 A | 4/2010 |
| JP | 2011511966 A | 4/2011 |
| WO | 2008022139 A2 | 2/2008 |
| WO | WO 2009080210 A2 * | 7/2009 |
| WO | WO 2010014244 A2 * | 2/2010 |

OTHER PUBLICATIONS

Wikipedia "Types of simple lenses" within entry "Lens (optics)" [online] [retrieved on Nov. 21, 2018]. Retrieved from the Internet <URL https://en.wikipedia.org/wiki/Lens_(optics)#Types_of_simple_lenses>.*

Anamorphic lens (1992). C. G. Morris (Ed.), Academic Press Dictionary of Science and Technology (4th ed.). Oxford, UK: Elsevier Science & Technology [retrieved on Dec. 20, 2018]. Retrieved from internet: <URL: https://search.credoreference.com/content/entry/apdst/anamorphic_lens/0>. (Year: 1992).*

Aug. 6, 2012 International Search Report and Written Opinion issued in corresponding unpublished International Patent Application No. PCT/EP2012/052472 by Christoph Roedig.

Capoulade, J., et al., "Spatially Resolved Fluorescence Fluctuation Spectroscopy (FFS) in Living Cells", "Biophysical Journal", Jan. 2010, p. 761a, vol. 98, No. 3 S1.

Wohland, T., et al., "Single Plane Illumination Fluorescence Correlation Spectroscopy (SPIM-FCS) probes inhomogeneous three-dimensional environments", "Optics Express", May 6, 2010, pp. 10627-10641, vol. 18, No. 10.

Capoulade, J., et al., "Quantitative Fluorescence Imaging of Protein Diffusion and Interaction in Living Cells", "Nature Biotechnology", Aug. 7, 2011, pp. 835-839, vol. 29, No. 9.

Engelbrecht, C., et al., "Resolution Enhancement in a Light-Sheet-Based Microscope (SPIM)", "Optics Letters", Feb. 27, 2006, pp. 1477-1479, vol. 31, No. 10.

Greger, K., et al., "Basic Building Units and Properties of a Fluorescence Single Plane Illumination Microscope", "Review of Scientific Instruments", Feb. 28, 2007, pp. 023705-1-023705-7, vol. 78, No. 2.

Huisken, J., et al., "Even Fluorescence Excitation by Multidirectional Selective Plane Illumination Microscopy (MSPIM)", "Optics Letters", Aug. 27, 2007, pp. 2608-2610, vol. 32, No. 17.

Holekamp, T., et al., "Fast Three-Dimensional Fluorescence Imaging of Activity in Neural Populations by Objective-Coupled Planar Illumination Microscopy", "Neuron", Mar. 13, 2008, pp. 661-672, vol. 57.

* cited by examiner

LIGHT-PAD MICROSCOPE FOR HIGH-RESOLUTION 3D FLUORESCENCE IMAGING AND 2D FLUCTUATION SPECTROSCOPY

The present application claims the benefit under 35 USC 119 of U.S. Provisional Patent Application No. 61/442,616 "Light Pad Microscope for high-resolution 3D fluorescence imaging and 2D fluctuation spectroscopy" filed on Feb. 14, 2011. The entire disclosure of U.S. Provisional Patent Application No. 61/442,616 is hereby incorporated herein by reference in its entirety, for, all purposes.

FIELD OF THE INVENTION

The present disclosure relates to optical microscopes and, in particular, to light microscopes with confined focal volumes and methods adapted for sample concentration fluctuation measurements.

Introduction

Diffusion contributes fundamentally to the mobility of soluble molecules and thereby to spatio-temporal aspects of many biological processes, from the regulation of cell division and signal transduction inside cells to hormone regulation during tissue genesis and to morphogen gradients in development. It is a challenge to quantify the diffusive properties of biomolecules inside complex cellular environments. Methods and apparatus that allow a direct analysis of diffusion processes are sparse and tailor-made to individual problems.

Determining the properties and behaviour of biomolecules, in particular of proteins and in particular in their natural environment is a key step in elucidating and analysing their functions and the mechanisms behind cellular and developmental processes. Fluorescence correlation spectroscopy (FCS) [1, 2] is a known method for analysis of molecular mobilities which provides information about mobile and immobile fractions of labelled molecules, their diffusion properties and concentrations as well as the co-diffusion of differentially labelled molecules that interact with each other.

Confocal laser scanning microscopes (confocal microscopes) are presently the instruments of choice for live cell imaging with high resolution [3] and for FCS as the confocal laser scanning microscopes enable diffraction limited imaging in combination with ultra sensitive photon counting using avalanche photo diodes (APDs). FCS measurements using the confocal laser scanning microscopes have been applied to quantify the dynamics of protein complex formation involved in signalling (by EMBL [4] and others [5]), to study the maturation of export-competent mRNPs [6, 7] or to characterize a morphogen gradient [8]. FCS measurements using the confocal laser scanning microscopes are termed confocal FCS in this disclosure. Confocal FCS experiments, however, remain a challenge because of the intrinsic limitation imposed by the sequential modus operandi—one point after the other—of confocal FCS data acquisition along with low total fluorescence photon yield with respect to photon input into a specimen due to out-of-focus illumination [9]. Usually, the confocal laser scanning microscopes permit only one or a few single-point measurements per cell at specifically selected positions [4, 10, 11]

In other words, confocal FCS does not provide spatially resolved information sufficient to generate images of cells and other biological samples that would allow to visualize diffusion processes and other FCS derived protein parameters (such as protein interactions) across entire cells or organisms.

Another disadvantage of known methods and apparatuses is that spatially resolved imaging of diffusion is limited or impossible.

SUMMARY OF THE INVENTION

The present disclosure teaches a microscope having an illumination light path for illuminating a sample or object and a viewing light path for viewing the sample. The microscope comprises an illumination light path focussing arrangement in the illumination light path, the illumination light path focussing arrangement defining a substantially two-dimensional sample or object illumination region extending along an illumination direction of the illumination light path and transversely thereto. The two dimensional object or sample illumination region can be considered to be a light stripe or light-sheet. The illumination light path focussing arrangement may also be understood as light path shaping arrangement as the illumination light is shaped into the two dimensional sample illumination region.

The microscope further comprises an illumination region-confining device in the illumination light path for selectively illuminating a portion of the substantially two-dimensional object illumination region, wherein the portion of the substantially two-dimensional object illumination region is confined at least in the illumination direction and/or in the direction transversely thereto. The light stripe is thus limited in at least one of the illumination direction and the direction perpendicular thereto essentially forming a portion of the substantially two-dimensional object illumination region also termed "light pad". A thickness of the substantially two-dimensional object illumination region and of the light pad is much smaller than the length in the illumination direction and the width in a transverse direction thereto. For example, the length of the portion of the substantially two-dimensional object illumination region in the illumination direction and the width in the transverse direction may be about 6-fold or more of the thickness of the portion of the substantially two-dimensional object illumination region.

The illumination light path focussing (and shaping) arrangement may comprise at least one of a cylindrical lens, an anamorphically shaped lens, a one-dimensional array of spherical or aspherical lenses. The illumination light path focussing (and shaping) arrangement may also comprise at least one anamorphically shaped mirror.

The illumination region-confining device may comprise at least a first aperture for confining the portion of the substantially two-dimensional object illumination region in the illumination direction. The illumination region-confining device may also comprise at least a second aperture for confining the portion of the substantially two-dimensional object illumination region in a direction transversely to the illumination direction. At least one of the first aperture and the second aperture may be adjustable and may be a circular iris or a rectangular aperture or a slit.

A viewing direction of the viewing light path may be substantially perpendicular to the illumination direction. The substantially two-dimensional object illumination region is then adjusted to be in the focal plane of a detection objective lens. In this aspect, the microscope may be based on a single plane illumination microscope (SPIM) with an illumination region confined at least in the illumination direction. Other viewing directions may be used with the present disclosure.

The detection light path or viewing light path may comprise at least one spatial filter that allows to confine the detection area to the portion of the substantially two-dimension illumination region.

The observation and detection of the sample may be performed with a detector pixel array such as a CCD or EM-CCD camera, onto which the substantially two-dimensional object illumination and detection region is projected/imaged using the viewing light path.

The present disclosure also teaches a method for observing/detecting a sample. The method comprises illuminating a two-dimensional portion of a sample by focussing an illumination light beam into a substantially two-dimensional object illumination region extending in an illumination direction of the illumination light beam and transversely thereto, wherein illuminating the two-dimensional portion further comprises confining the substantially two-dimensional object illumination region for selectively illuminating a portion of the substantially two-dimensional object illumination region, wherein the portion of the substantially two-dimensional object illumination region is confined in at least one of the illumination direction and the direction transversely to the illumination direction. The portion of the substantially two-dimensional object illumination region may be termed light-pad.

The method may comprise moving at least one of the substantially two-dimensional object illumination region or the portion of the substantially two-dimensional object illumination region through the sample. This may be used for scanning through the sample. The moving of the substantially two-dimensional object illumination region and/or of the portion thereof my be performed in 3D in the sample by at least moving one of the illumination objective lens, by moving the illumination light path focussing arrangement or elements thereof, by scanning with a scanning unit, by moving the illumination region-confining device and by changing the collimation of the illumination light path (This can be done by manipulating the wavefront e.g. with spatial light modulator (SLM) or with a mirror with a modifiable curvature).

The recording of the light from the sample on every pixel of the detector pixel array may be integrated over a certain period of time in order to obtain an image of the distribution of e.g. fluorescent molecules in the substantially two-dimensional object illumination and detection region.

The light from the sample on every pixel of the detector pixel array may be recorded for a sequence of short time intervals to which a spatio-temporal correlation analysis can be applied to obtain FCS data for each pixel on the detector array.

The method may further comprise measuring a signal fluctuation in the portion of the substantially two-dimensional object illumination region. The fluorescence intensity time trace at each pixel or a region or of the portion of the substantially two-dimensional object illumination region may be subject to a fluctuation analysis. The fluctuation analysis can be at least one of temporal autocorrelation analysis, temporal cross-correlation analysis between the signals from different pixels, temporal cross-correlation analysis between the signals from different spectral channels, photon counting histogram, photon coincidence analysis between the signals from different pixels, photon coincidence analysis between the signals from different spectral channels, and other methods known to people skilled in the art.

SHORT DESCRIPTION OF THE FIGURES

Further aspects and details of the invention will become evident when reading the detailed description with reference to the attached figures, wherein.

DETAILED DESCRIPTION

Figure 1:
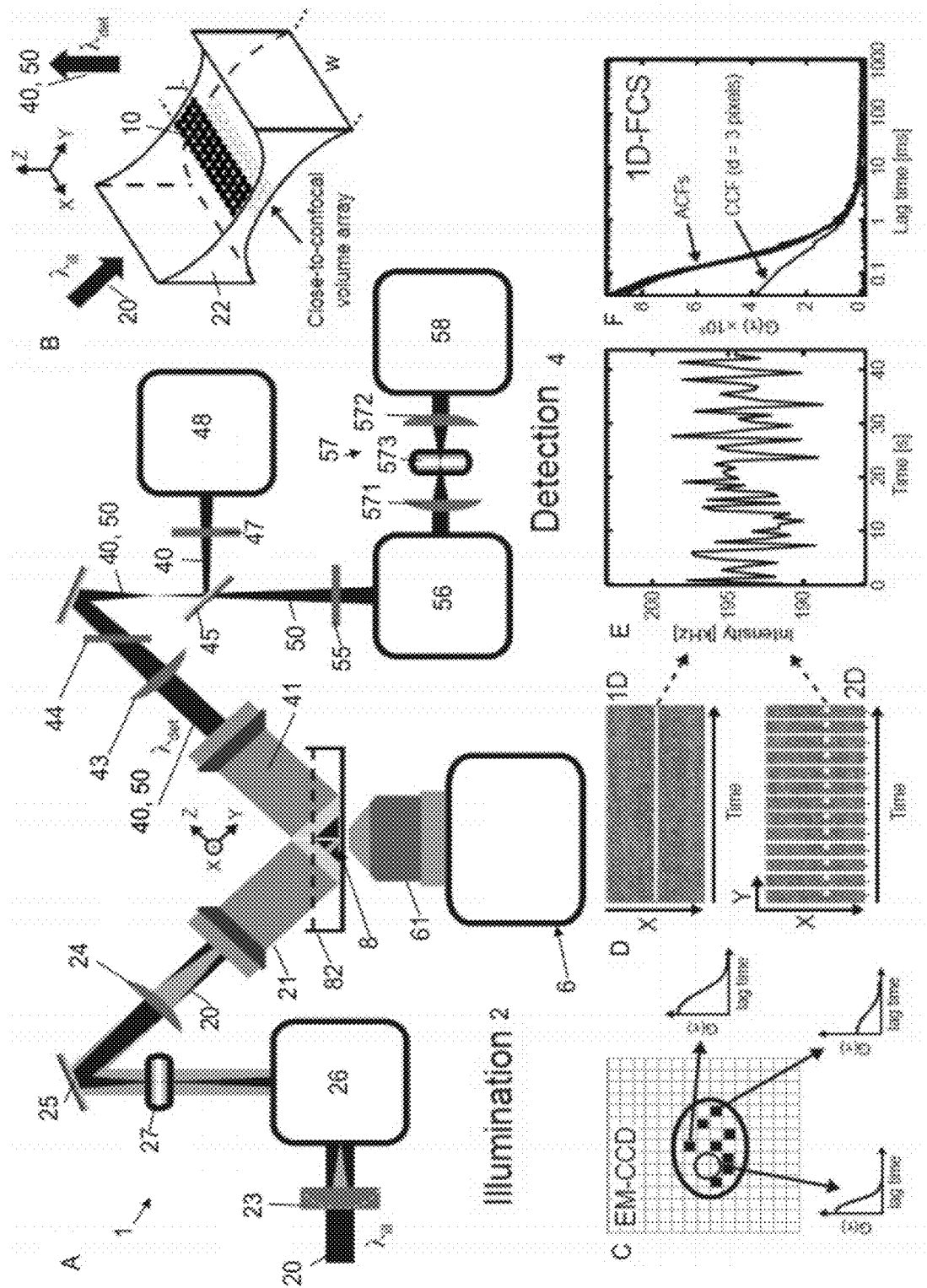
FIG. 1A shows light-sheet based FCS imaging with a diffraction limited light-pad.
FIG. 1B shows an observation volume element in the light pad of FIG. 1A.
FIG. 1C shows a temporal correlation analysis of the intensity time trace at a pixel.
FIGS. 1D-1F show information about movements of fluorescent molecules.

The invention will now be described with reference to the drawings. It will be understood that the examples, embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention and that not all features of the examples and embodiment are necessary to implement the invention.

The disclosure teaches a novel microscope termed light-pad microscope 1. The light-pad microscope 1 consists of three modules as shown for example in FIG. 1A and in more detail in FIG. 2: (i) an illumination unit 2 that generates a diffraction-limited light-sheet 22 from an illumination light beam 20; the diffraction-limited light-sheet 22 is confined in at least one direction, thus defining the light-pad 10; (ii) a detection unit 4 that allows the observation along at least one detection light path 40,50 of the focal area of the light-sheet 22 and/or of the light-pad 10; and optionally (iii) an inverted microscope 6 that allows convenient positioning of specific areas of the specimen or sample 8 into the focus of the light pad 10.

The light-pad microscope 1 of the disclosure provides full spatial control over the excitation of fluorescence as only a cross-section of the specimen 8 is illuminated by the light sheet 22 and unnecessary out-of-focus exposure is avoided. Concomitantly all emitted photons originate from the focal plane of light-sheet 22 and no filtering of photons based on their spatial origin is needed.

The light-pad microscope 1 is based on two orthogonally arranged objective lenses, an illumination objective lens 21 and a detection objective lens 41. The illumination objective lens 21 and the detection objective lens 41 can be long working distance objective lenses, such as, but not limited to 40×/0.8 NA objectives. It will be appreciated that other objectives with different magnifications an/or numerical apertures can be used. The illumination objective lens 21 and the detection objective lens 41 can be identical or can be different objective lenses with different magnification and/or different numerical aperture. The illumination objective lens 21 and the detection objective lens 41 can be dipped into a Petri dish 82 containing the specimen 8.

The light-pad microscope 1 can be used with any wavelength or any combination of wavelength considered useful in imaging or FCS and may depend on the sample 8 and the dyes used to investigate the sample 8. For detection of GFP fluorescence, for example, the 488 nm line of an Argon laser 220 (shown in FIG. 2, for example Innova Sabre SBRC-R-DBW/20 from Coherent) with an output power of for example 2W can be used. The power of the illumination beam 20 can be adjusted for example by passing the illumination beam through a half-wave plate 222 (for example WPMH05M-488, Thorlabs) placed in front of a polarizer 224 (for example a Glan-Taylor polarizer, such as a GL5-A, Thorlabs) followed by an acousto-optical tunable filter 226 (for example AOTF; AA.AOTFnC-400.650-TN, AA Opto-Electronic). A single-mode optical fiber 228 (for example kineFLEX-P-3-S-458-640-2.0-2.0-PL, Point Source) can be used to deliver the light to the setup contained on a breadboard 7. In another implementation, the laser light can be delivered directly to the setup by using optical elements such as mirrors (not shown).

To shape the illumination light beam 20 for the generation of the light-sheet 22, the illumination light beam 20 can be first collimated and expanded anamorphically so that in one direction an approximately constant section is cut out of the Gaussian profile. In the other direction, the illumination light beam 20 is focused with a cylindrical lens 23 (for example with f=75.6 mm). For a precise positioning of the light-sheet 22 in the sample, the illumination light beam 20 passes through a scanning module 26 composed, for example, of a galvanometer-driven mirror 262 (VM-500+, GSI) arranged at the back focal plane of an F-theta scan lens 264 (S4LFT0061, f=60 mm, Sill Optics). A tube lens 24 (for example with f=245.60 mm) and a water dipping illumination objective lens 21 (for example, Plan-Apochromat 40×/0.8 NA, Leica) with a long exemplary working distance of 3.3 mm may be used to generate the light-sheet 22 in the sample 8. The width of the light-sheet 22 can be adjusted for example between about 20 and 200 µm by modifying for example the size of a width confining slit or an width confining iris 27 placed in the back focal plane of the tube lens 24. This allows the illumination of only a part of the sample and thus prevents photo bleaching of neighbouring regions during the measurement or image acquisition. A mirror 25 between a scan lens 264 and a tube lens 24 deflects the beam by 45° so that the illumination objective lens 21 points under 45° to a horizontal plane (bottom of the Petri dish) containing the specimen or sample 8.

A multiple slit arrangement in the illumination light path 20 is used to confine the light-sheet 22 to a light-pad 10 by an illumination region-confining device. The illumination region-confining device may comprise the width confining slit or iris 27 for confining the width w of the light-sheet 22. The illumination region-confining device may further comprise a length confining slit or iris 29 arranged for example between the tube lens 24 and the illumination objective lens 21 for confining the length 1 of the illumination region or light-sheet 22 in the illumination direction of the illumination light path 20. Thus the light-sheet 22 can be confined to length 1 and width w forming the light-pad 10 (of width w and length 1) as illustrated in FIGS. 1B and 3*a*. The upper image of FIG. 3*a* shows the view on the light-pad 10 through a detection objective lens 41 along the z-direction of FIGS. 1A, 1B and 2. The lower image of FIG. 3*a* shows the light-sheet 22 and the light-pad 10 seen along the x-direction of FIGS. 1A, 1B and 2, showing the thickness d of the light-sheet 22 and the light-pad 10. Adjustments of the scanning modules 26 and positions of length confining slit 29 and of the width confining slit 27 provide convenient positioning of the light-pad 10 inside a selected region of the specimen 8 (FIG. 1A, 1B and FIGS. 3*a* to 3*c*).

For the collection of the emitted fluorescence, a detection objective lens 41, the observation lens, is arranged in an angle of 90° (FIG. 2) to the illumination objective lens 21. In order to avoid reflected laser light, a dichroic mirror 44 (for example a BS HC R488, AHF Analysentechnik if excitation at 488 nm is used) may be placed in front of the detection tube lens 43 that follows the observation lens 41. A flip-mirror 45 may be used to flip the fluorescence light between two alternative detection paths, a first detection light path 40 and a second detection light path 50. Between the sample 8 and the flip-mirror 45, the first detection light path 40 and the second detection light path 50 are superimposed and use the same elements. The present disclosure can be used with both the first detection light path 40 and the second detection light path 50 or only the first detection light path 40 or only the second detection light path 50 can be implemented. If only one light path is used, the flip-mirror 45 can be omitted.

The first detection light path 40 can be used for intensity light-sheet imaging and may comprise a band-pass filter 47 (for example a BrightLine HC 525/45, AHF Analysentechnik) and a Keplerian telescope 46, which may affect the total magnification. The fluorescence signal is focused along the first detection light path 40 onto an electron-multiplying charge-coupled device (EM-CCD) camera 48 (for example a QuantEM:512SC, Photometrics), referred to as imaging camera 48. The pixel size of this imaging camera 48 may be in the sample plane 131×131 nm$^2$ (actual size on the chip: 16×16 µm$^2$) and the field of view corresponds to an area of 67×67 mm$^2$ in the sample. Smaller or larger pixel sizes and chips and different geometries of the chip can be used.

For light-pad microscopy 1 using the imaging camera 48 and first detection light path 40, shown FIG. 1A and FIG. 2, the sample 8 can be positioned in 3D using a motorized stage 84 holding the sample 8. Image stacks can be acquired at equidistant sample positions along the optical axis of detection (z-axis) for the case of roundish objects (such as beads or yeast cells). For the case of laterally extended objects used as sample 8, such as Drosophila larva wing imaginal disks, stacks of images can be acquired horizontally (in y-z direction). Larger effective fields of views can be achieved by tiled imaging of neighbouring regions.

The second detection light path 50 may be used for FCS imaging (1D-/2D-FCS recordings) and/or intensity imaging. The second detection light path 50 can contain a band-pass filter 55 (for example BrightLine HC 525/45, AHF Analysentechnik) and a scanning module 56. Spatial filtering is achieved by a spatial filter 57 that may comprise two lenses, for example achromatic doublets, a first lens 571 and a second lens 572 (for example f=60 mm, Thorlabs) and an adjustable slit 573 (for example 07 SLT 701, Melles-Griot) placed in the image plane of the first doublet 571. The adjustable slit 573 may also allow for confinement of the light pad 10 arranged perpendicular thereto. The scanning module 56 enables positioning of the region for FCS imaging within the illuminated area of the sample 8, whereas the spatial filter 57 allows the adjustment of the size of the image of this illuminated area. In other words, a section or a portion of the light pad 10 can be selected for imaging or detection along the second detection light path 50. Together with lateral confinement of the light-sheet 22 by the spatial filter 27 (iris) in the illumination light path 20, this defines the light-pad 10 (FIG. 1B and FIG. 2a). Finally, a focussing lens 59, for example an aspherical lens (f=40 mm, Thorlabs), focuses the fluorescent light onto a second EM-CCD camera (for example SamBa SE-34, Sensovation), referred to as FCS camera 58. The total magnification of the second detection light path 50 may be, for example 39×, which may lead to a pixel size of 190×190 nm2 in sample space (actual size on the chip: 7.4×7.4 µm2), and to a maximum field of view that corresponds to 124×94 µm2 in the sample. Other magnifications and other pixel sizes and different detector arrays may be used with the present disclosure and may be adapted to the microscope and the sample 8 to be investigated.

For one-dimension (1D)-FCS data acquisition, the optical path 50 leading to the FCS camera 58 can be used (FIG. 1A and FIG. 2). In order to increase the time resolution, the EM-CCD of the FCS camera 58 may be, if desired, operated in line-scan mode. Instead of transferring a complete frame from the sensor area to the storage area of the chip between subsequent exposure intervals, only a single line is shifted. Then, a fraction of a line or a complete line is transferred through the A/D conversion and amplification chain of the chip and to the framegrabber card PCI-1422 (National Instruments). The readout process is the time-limiting step of CCD image acquisition and this procedure increases significantly the time resolution, e.g. leading to, for example 40 µs (or 25,000 lines per second) for a fraction of 120 pixels of a line. For in vivo measurements, for example 340 pixels (half a line) with a time resolution of 70 µs can be acquired in order to extend the field of view. To increase the number of photoelectrons per data point, the spatial filter 57 in the second detection light path 50 can be arranged such that several lines are illuminated.

The fluorescence signal may be acquired, for example, for 30-60 s for each measurement. The laser may switched off before and/or during measuring (for example for 5 s) in order to assess the overall background of the measurement.

Figure 4:
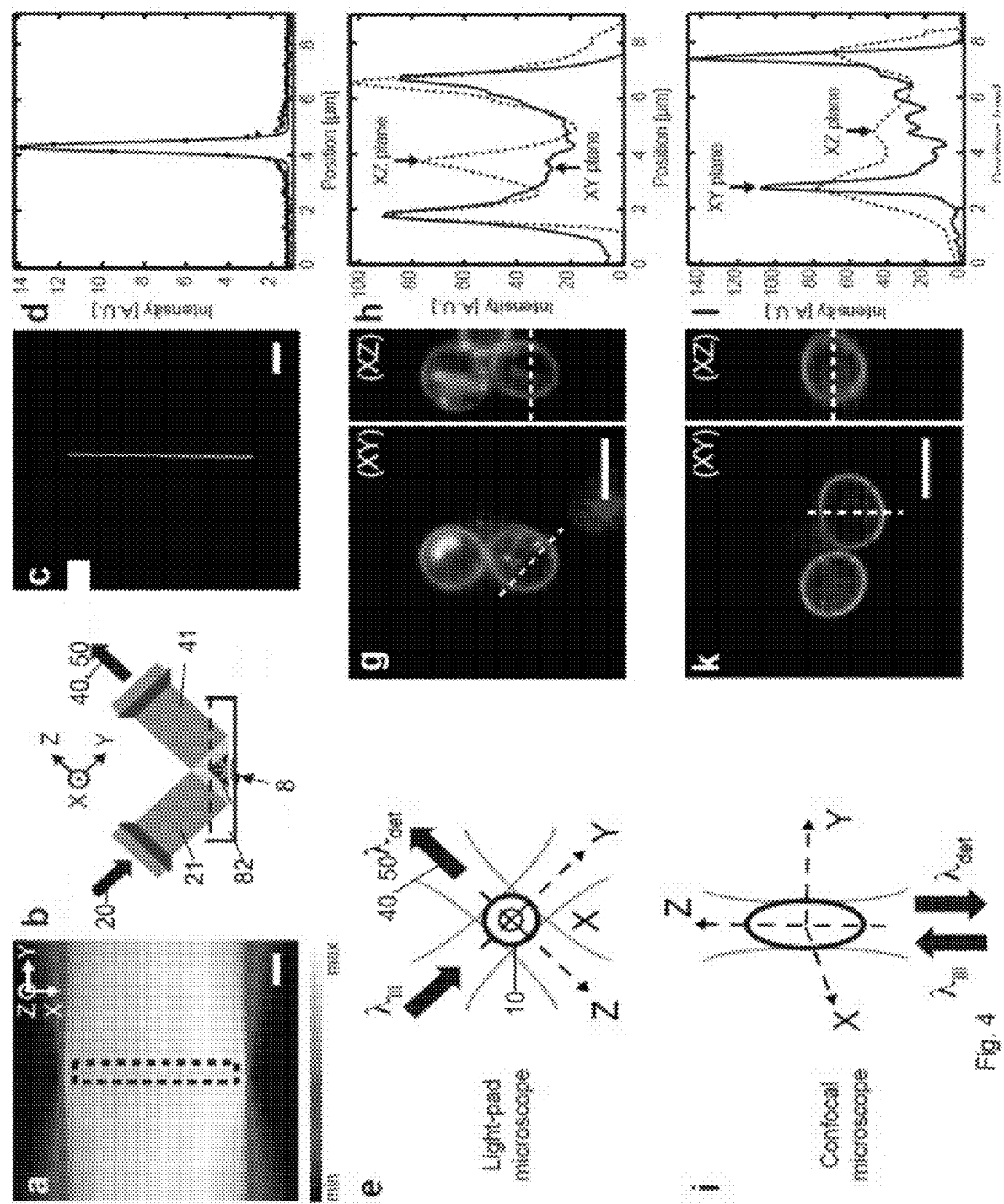
FIGS. 4a-4e, 4g-4i and 4k-4l illustrate the optical properties of the light-pad microscope.

Two-dimensional (2D)-FCS measurements can be performed following the same procedure as for 1D-FCS. The spatial filter 57 may be adjusted in order to illuminate, for example, 20 lines of the EM-CCD chip of FCS camera 58. The corresponding 20 lines are then transferred, for example, to a storage area between subsequent exposure intervals and then converted, amplified and transferred to a frame grabber as a single frame. Here, a time resolution of for example 700 µs can be achieved with present technology when using a frame size of 20 lines of 340 pixels. As for 1D-FCS, for example 5 s at the beginning of or during each measurement can be used to determine the overall background of the signal. Time series of images or 2D-kymographs are shown in FIGS. 1d, 4g).

Figure 2:
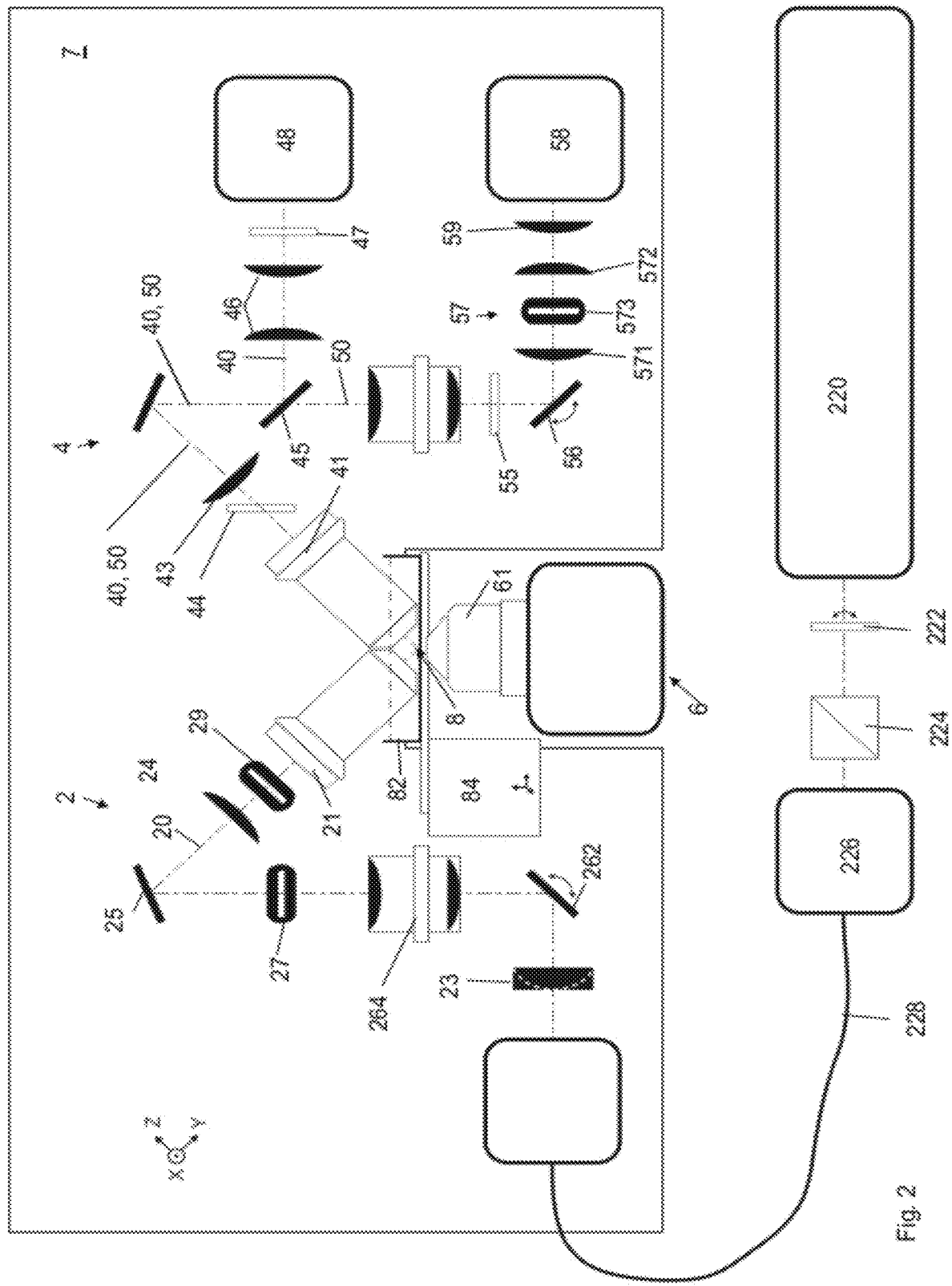
FIG. 2 shows the microscope of FIG. 1a in more detail.
Figure 3A:
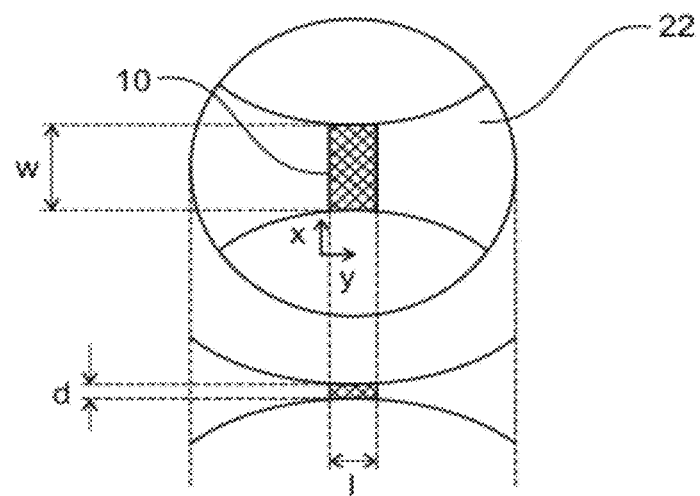
FIGS. 3a to 3c illustrates the optical light-pad.
Figure 3B:
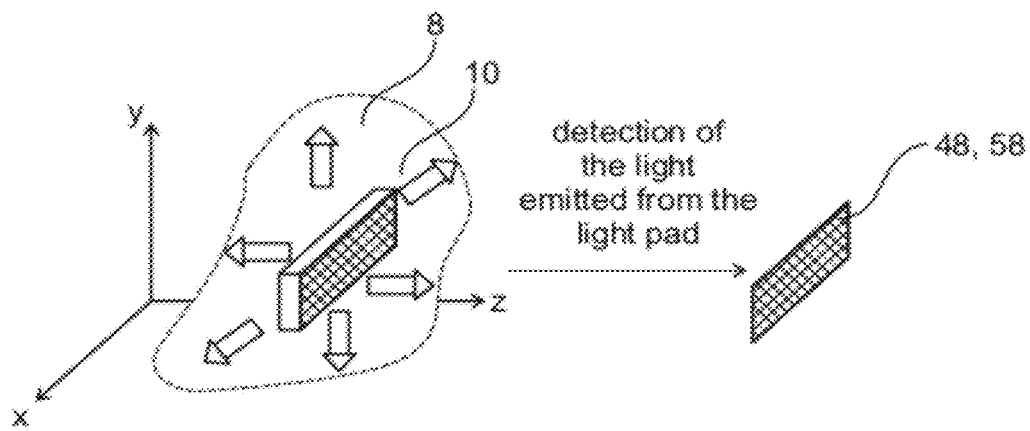
Figure 3C:
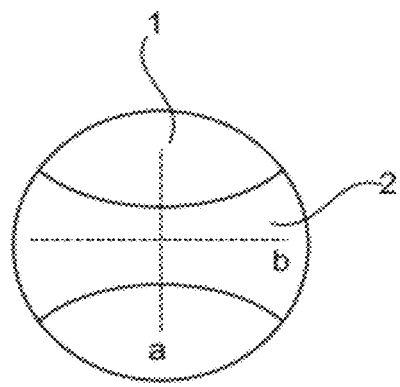

An imaging light path 40 with an imaging camera 48 and a separate FCS light path with an FCS camera 58 is described in the above examples with reference to FIGS. 1 and 2. It is also possible to use a combined imaging and FCS light path with a single camera or imaging device used for both the combined imaging and FCS light path. The flip mirror 45 may be omitted.

The laser power used for the FCS imaging can be measured at the focal plane of the illumination lens using for example a Nova II power meter equipped with a PD300 detector (Ophir Optronics, Jerusalem, Israel). In a typical example of a 1D-/2D-FCS in vivo experiment, the laser intensity in focus of the light sheet 22 may be in the range of a few kW·cm$^{-2}$. This corresponds to the lower limit of the focal intensity typically used in a conventional confocal FCS setup. Thus, the intensity used in a confocal setup to conduct one FCS measurement allowed the conduction of for example 20 measurements (along the pixels). Thus, and in addition to the avoidance of out-of-focus illumination, the light-pad microscope 1 provides for this example an at least about 20-fold increased efficiency as compared to a usual confocal FCS setup.

In addition, an axial scanning of the illumination objective lens 21 and synchronized scanning of the detection area by synchronized scanning of the detection scanning module 56 or of the detection spatial filter/slit 573 allows to scan the light-pad 10 within the field-of-view of the detection objective lens 41. Alternatively the cylindrical lens 23 can be scanned to achieve the same effect. Alternatively, a controlled collimation/decollimation of the beam for example by replacing mirror 25 with a spatial light modulator, for example a mirror with adjustable curvature, can be applied to achieve the same axial scanning of the light-pad 10.

Each pixel of the FCS camera 58 collects the light emitted from a corresponding observation volume element in the light-pad 10 (FIG. 1B). Individual ones of fluorescent molecules such as GFP-tagged proteins generate spatio-temporal concentration (and fluorescence) fluctuations when the fluorescent molecules move within the light-pad 10 e.g. driven by diffusion, thereby crossing individual volume elements. With the use of an EM-CCD chip as FCS camera 58, these fluctuations can be recorded with high time resolution and single-photon sensitivity. Temporal correlation analysis of the intensity time trace at each pixel (FIG. 1c) provides statistical information about frequency and speed of inbound and outbound movements of the fluorescent molecules for each individual one of the volume elements (FIGS. 1D-1F). Upon calibration, this information is translated into spatially resolved maps for example of protein concentrations and protein mobilities, such as diffusion coefficients in the case of soluble molecules.

The optical properties of the light-pad microscope 1 are such that the light-pad microscope 1 generates a diffraction-limited light-pad of a length of approx. 4 µm along the illumination axis providing an array of close-to-confocal individual volumes (see FIG. 1B, FIGS. 3a to 3c and FIG. 4). The width of the light-pad 10 is adjustable by the slit 27 in the illumination light path 20. The pixels of the FCS camera 58 subdivide the maximum usable light-pad area of 3.8×65 µm$^2$ (FIG. 4a) into 20 lines of 340 pixels. The observation volume amounts to ~0.31 fL and corresponds to an almost isotropic point spread function (PSF) (FIG. 4e, 4g,4h). The dimensions of the observation volume are determined by the thickness of the light-sheet 22, which may be about 0.7 µm (1/e$^2$ along the z axis) or less and by the lateral resolution of the detection objective 41. This yields an observation volume that is for example about 1.6-fold larger than the one of a standard confocal microscope (FIG. 4i, 4k,4l).

The light-pad microscope 1 may be built on a vertically erected breadboard 7, as shown in FIG. 1A and FIG. 2. This vertical configuration of the setup has the additional advantage that the vertical configuration enables the use of Conventional Petri dishes 82 (without the need of 3D cell culturing or embedding samples in gel, e.g. agarose) with, for example, 60 mm diameter filled with a medium into which the two objective lenses are dipped directly (FIG. 1B, FIG. 2). The vertical configuration also avoids optical aberrations due to refractive index changes at air-glass, glass-medium or medium-agarose interfaces that can be encountered using a conventional light-sheet microscopy configuration with a dry objective lens for illumination. To allow free movement of the sample 8, the Petri dish 82 may be fixed on a three-axis motorized stage 84 (for example: stepper motors: LN-Mini23 manipulator block XY and LN-Mini Z vario, Cell Biology Trading/Luigs & Neumann that enables positioning of the sample 8 with an accuracy of, 50 nm)

The light-pad microscope 1 can be designed such that the sample 8 can be observed from underneath (for example through the glass bottom of the Petri dish, if used) with the help of an optional conventional inverted microscope 6 (for example a Olympus IX 70) equipped with an objective lens 61. For example a long working distance dry objective lens may be used such as a 20×/0.4 NA lens. A person skilled in the art will choose the best lens for the needs of the application. Due to its larger field of view, the inverted microscope 6 allows easier and faster positioning of larger ones of the biological specimens 8 in the light-pad or fast selection of cultured cells appropriate for FCS. For their observation during specimen positioning, transmitted light illumination for example using a white light emitting diode placed above the Petri dish 82 can be used.

Optionally, standard confocal fluorescence images, image stacks and FCS data can be acquired on the inverted microscope 6, for example if a confocal laser scanning microscope is used (for example Leica TCS SP5 AOBS SMD FCS equipped with an HCX PlanApo CS 63×/1.2 NA water immersion objective lens). For excitation, the 488 nm line of an Ar laser or another excitation wavelength may be used. The fluorescence can be detected with a photomultiplier tube for imaging and an avalanche photodiode (for example SPCM-AQR-14, Perkin-Elmer Optoelectronics) for imaging and/or FCS. In this particular example the diameter of the detection pinhole was fixed to the size of 1 Airy disk. The laser power in the sample 8 was well below about 200 µW for FCS and below 500 µW for confocal laser scanning microscopy (CLSM) acquisition as measured in front of the objective lens. For FCS data acquisition, an incident light beam 60 was parked at a position of interest in a previously acquired image, and laser illumination and detector read-out were started for 30-60 s.

FIG. 4a shows the illumination light-sheet imaged with the imaging camera (z axis is viewing direction) and visualized by illuminating in this case Alexa488 dissolved in water. The dashed region highlights the light-pad 10, in this particular example adjusted to a region of 3.8×65 µm$^2$ where the light-sheet 22 is thin enough to provide sufficiently small individual observation volume elements (FIG. 1B). In order to characterize the light-sheet thickness, an horizontal mirror can be placed in the centre of the Petri dish 82 filled with water and positioned the Petri dish 82 with the horizontal mirror in the focal planes of both the illumination objective lens 21 and the detection objective lens 41 to reflect the light-sheet 22 directly into the detection objective lens 41, as shown in FIG. 4b. After removing the dichroic mirror 44 and the emission filter 47 from the first detection light path 40, the focal cross-section of the light-sheet 22 was imaged with the imaging camera 48. The resulting image is shown in FIG. 4c. Fitting a Gaussian function to the averaged horizontal intensity profile yielded a full width at 1/e$^2$ of 700±10 nm (FIG. 4d).

The overall PSF was characterized by analyzing image stacks of individual fluorescent beads of 20 nm diameter (see FIG. 4e for the definition of the axes). From fits of 3D Gaussian functions to image stacks of beads, a lateral (x-y) 1/e$^2$ radius of 370±20 nm and an axial (z) 1/e$^2$ radius of 410±40 nm can be used, which means that the PSF is almost isotropic, with an individual observation volume of 0.31 fL. A comparison of lateral and axial intensity profiles extracted from 3D stacks through yeast cells expressing the membrane protein Pma1 fused to GFP (FIG. 4g-h) confirms the isotropic profile of the PSF.

FIG. 4i, 4k, 4l show a direct comparison of the same beads characterized using a Leica SP5 confocal microscope equipped with the 1.2 NA water immersion objective and used for confocal FCS. Following the same scheme a lateral 1/e$^2$ radius of 240±10 nm and an axial (z) 1/e$^2$ radius of 600±20 nm was obtained, i.e., the PSF is significantly more anisotropic with a volume of 0.19 fL. Taken together, the PSF of the light-pad microscope is isotropic and approx. 1.6-fold larger than the one of a standard confocal microscope and therefore small enough to enable FCS measurements. In addition, the light-pad microscope 1 enables isotropic 3D imaging of samples 8 without the need of imaging the sample from different directions by sample rotation or image deconvolution as compared to conventional light-sheet microscopy.

Figure 5:
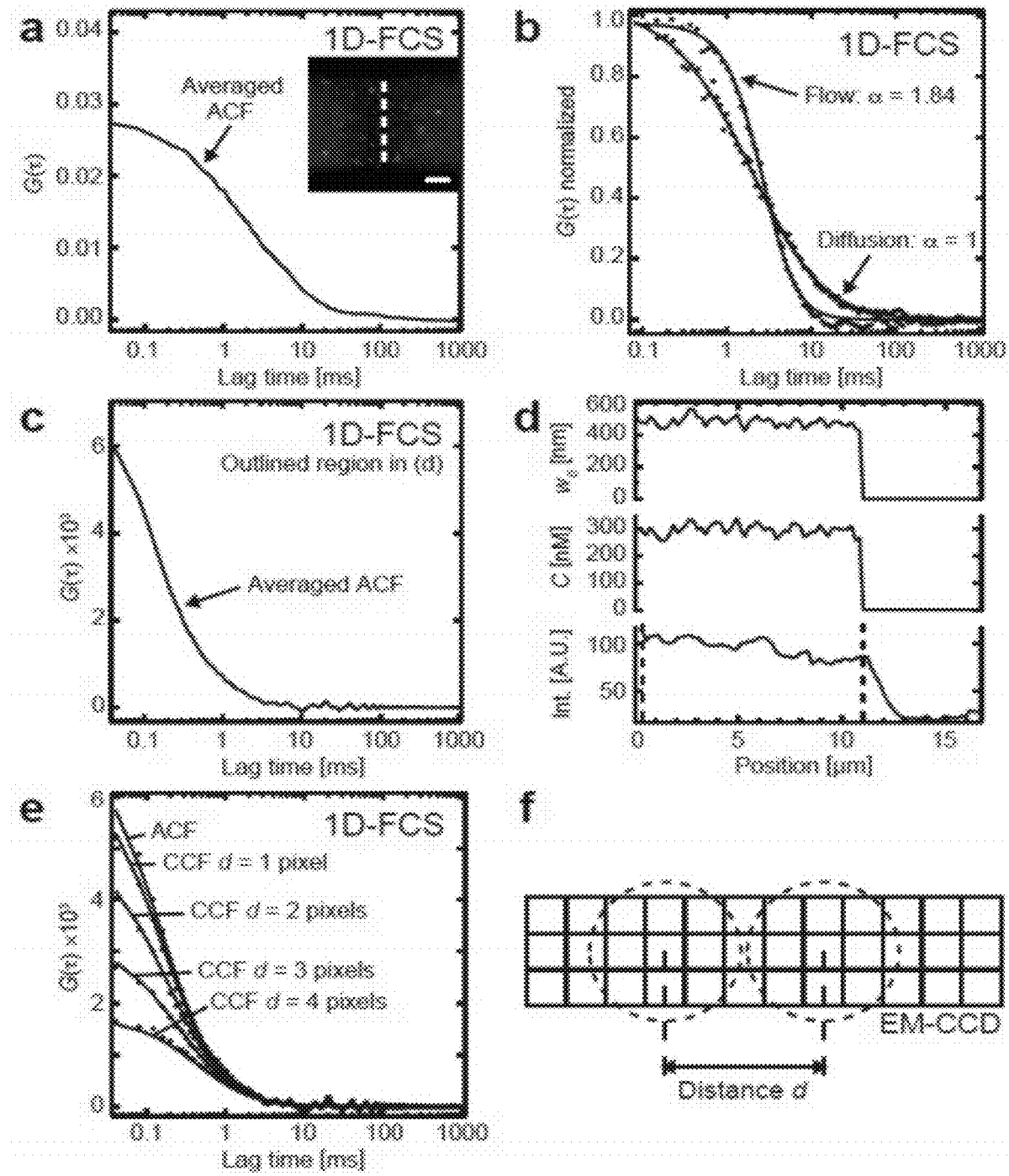
FIGS. 5a to 5f show 1D-FCS measurements in solution.

FIG. 5 shows examples of in vitro 1D/2D-FCS recordings. The light-pad microscope 1 is used for FCS of fluorescent samples in vitro, in this application example. 1D-FCS data of FluoSphere fluorescent beads with a diameter of 20 nm as sample 8 were recorded. FIG. 5a shows 250 individual autocorrelation functions (ACFs) that were calculated from a 1D-FCS recording along the dashed line shown in the insert. The fluorescent beads tended to form heterogeneous aggregates, which were clearly visible in the image raw data (bright dots in the insert shown in FIG. 5a) and which caused a pronounced amplitude and decay heterogeneity of the ACFs. Therefore the ACFs shown in FIG. 5a were obtained after removing the spikes corresponding to aggregates from the intensity time traces. When performing the 1D-FCS recording close to the surface, at the bottom of the Petri dish 82, a pure Brownian motion of the fluorescent beads was observed whereas in the center of the drop the observable motion was dominated by convective flow. The quality of the aggregate-filtered FCS data allowed us to distinguish the two modes of transport: the ACFs (FIG. 5b) could be fitted with the one-component anomalous diffusion model, (using Eq. (2) defined below), obtaining different anomaly parameters of 1.0 and 1.85, respectively, the former being indicative of pure diffusion and the latter of directional motion as expected from the movements of the large aggregates that can be seen in the movies.

FIG. 5c shows 1D-FCS recordings on a solution of Alexa488 diffusing in distilled water, in order to show the performance of the light-pad microscope 1 and to validate the measured specifications. The 60 individual ACFs are shown in FIG. 5c and recorded from the pixel range marked in FIG. 5d showed only minor variation in amplitude and time dependence. Fitting the ACFs with the one-component free diffusion model, the axial focal radius of 410 nm as determined before and a diffusion coefficient of 320 µm$^2$s$^{-1}$ as determined independently by cross-correlation analysis (see below and FIG. 5e) allowed the retrieval of an effective lateral focal radius of 490±30 nm (FIG. 5d). For comparison, we calculated the theoretically expected value: since we applied 3-pixel binning to the data (FIG. 5o, we convoluted a rectangular detection profile of 3×190 nm length and a Gaussian function with a $1/e^2$ radius of 370 nm as determined above to obtain an effective detection profile that could be well fitted by a Gaussian function with a $1/e^2$ radius of 500 nm in good agreement with the experimental results. The effective focal volume including binning was 0.57 fL. The molecule numbers obtained from the fit could be transformed into a concentration profile (FIG. 5d) that was virtually constant along the line and allowed to retrieve well the fluorophore concentration used. Thus, 1D-FCS of Alexa488 confirms fully the imaging-based PSF measurements in an independent manner.

In addition to the ACFs calculated, the spatial cross-correlation can be calculated as a function of distance between pixels as shown in FIG. 5e-f and by fitting Eq. (2) globally to the CCFs for pixel distances of 0 to 4, we obtained a diffusion coefficient of $320\pm10$ $\mu m^2 s^{-1}$ as an independent fit parameter.

Figure 6:
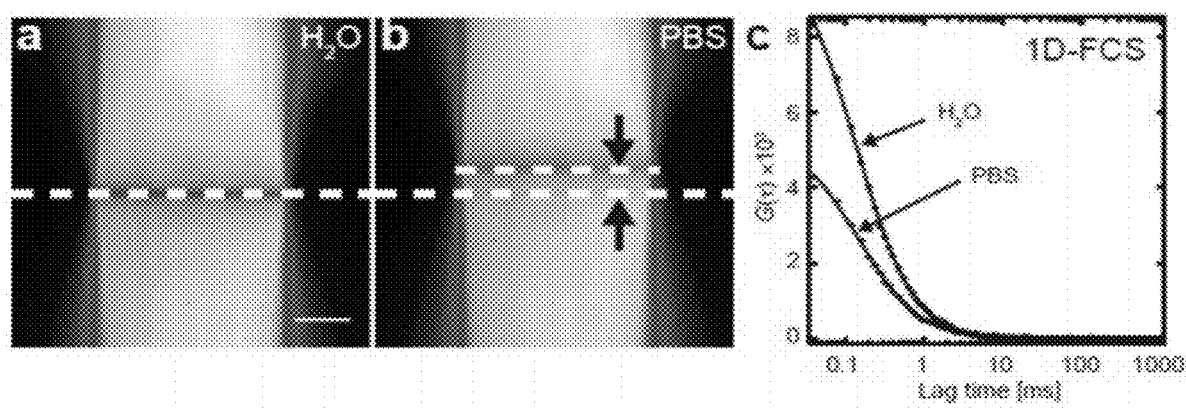
FIGS. 6a to 6c show the impact of cell medium on focussing the light sheet.

FIG. 6 shows the impact of the refractive index of the cell-culturing medium on focussing the light sheet 22. Working in a medium with a refractive index different from that of water, for which the objective lenses are designed, is expected to result in optical aberrations. Considering the long working distance of the objectives 21, 41 that can be used with the light pad microscope 1, even faint differences may exhibit an influence that cannot be ignored. In order to assess this effect on the data obtained from 1D-/2D-FCS recordings with the light-pad microscope 1, we observed the position of the beam waist of the light-sheet 22 using Alexa488 dissolved in water or buffers with different refractive indices (see FIG. 6a-b). Upon illumination with sufficiently high intensity, the waist of the illumination beam could be identified as dark narrow region because of fluorophore saturation close to the illumination focus. This effect could be used to determine precisely the position of the light pad 10. When using Phosphate buffered saline (PBS) instead of water a displacement of the light-pad 10 by 4.5 µm or 0.14% of the working distance towards the illumination objective 21 could be observed (see FIG. 6b). This result demonstrates that the refractive index of the growth medium has to be considered and that the system needs to be adjusted accordingly by proper refocusing and repositioning of the detection objective lens.

FIG. 6c shows 1D-FCS ACFs of Alexa488 at a concentration of 250 nM dissolved in water, 1×PBS, and 1×PBS with $Ca^{2+}$. Fitting the ACFs with a one-component free diffusion model yielded a significant decrease of the amplitudes of 48% for PBS and 64% for PBS/$Ca^{2+}$, when compared to water. In contrast, for the diffusion correlation times only a small relative increase of 9% for PBS and 13% for PBS/$Ca^{2+}$ was observed when compared to water. The differences of the diffusion correlation times could be assigned to the different viscosities of PBS and water (0.99 and 0.89 mPa s at 25° C.); [12, 13]. This indicates that the focal radius was not affected by differences in the refractive index of the medium and that the decreased amplitude resulted from increased out-of-focus signal. To account for the effect of the spherical aberrations on the amplitude we applied to the concentration values obtained from data fitting a correction factor of 0.52 for in-vivo measurements in PBS and of 0.36 for in-vivo measurements in PBS/$Ca^{2+}$.

Data Processing an Analysis

An example for data processing and data analysis that may be used with the present disclosure is given below. A person skilled in the art will understand that other data processing or data analysis methods can be used depending on the parameter to be investigated. Known data processing and data analysis method for diffusion of fluorescent molecules (or of fluorescent particles) can be used with the present disclosure.

For each pixel of a 1D- and 2D-FCS measurement, the intensity time trace $F_{x,y}(t)$ from pixel x in line y can be extracted from the image files after subtracting the background signal as acquired in the first 5 s or another part of the full acquisition time and after transforming the pixel gray values into numbers of photoelectrons as described previously. From the resulting fluorescence intensity traces, as well as from the confocal FCS measurements, the auto-correlation functions (ACF) and cross-correlation functions (CCF) can be computed according to $$G_{x_1,y_1,x_2,y_2}(\tau) = \frac{\langle \delta F_{x_1,y_1}(t)\delta F_{x_2,y_2}(t+\tau) + \delta F_{x_2,y_2}(t)\delta F_{x_1,y_1}(t+\tau)\rangle}{2\langle F_{x_1,y_1}(t)\rangle\langle F_{x_2,y_2}(t)\rangle} \quad (1)$$

with $$\delta F_{x,y}(t) = F_{x,y}(t) - \langle F_{x,y}(t)\rangle \text{ and } \langle ... \rangle = 1/T \int_0^T dt$$

Slow variations e.g. due to photobleaching can corrected using a sliding average approach. The resulting ACFs and CCFs can be fitted for example with Matlab (The Math-Works) using the non-linear least-squares Levenberg-Marquardt algorithm with the general model function $$G_{x_1,y_1,x_2,y_2}(\tau) = \frac{1}{N}\left[1-\Theta+\Theta\exp\left(-\frac{\tau}{\tau_{blink}}\right)\right] \quad (2)$$

$$\sum_{i=1}^{2} f_i\left[1+\left(\frac{\tau}{\tau_{diff,i}}\right)^{\alpha_i}\right]^{-1}\left[1+\frac{w_0^2}{z_0^2}\left(\frac{\tau}{\tau_{diff,i}}\right)^{\alpha_i}\right]^{-1/2} \times \exp$$

$$\left\{-\frac{(x_2-x_1)^2\delta^2+(y_2-y_1)^2\delta^2}{w_0^2}\left[1+\left(\frac{\tau}{\tau_{diff,i}}\right)^{\alpha_i}\right]^{-1}\right\}$$

in which N is the (apparent) number of molecules and which accounts for molecular blinking with the fraction Θ of molecules in a non-fluorescent state of lifetime $\tau_{blink}$ and considering anomalous diffusion of two components $f_1$, $f_2=1-f_1$ with the diffusion correlation times $\tau t_{diff,i}=w_0^2/(4D_i)$, the lateral and the axial focal radii $w_0$, $z_0$, the apparent diffusion coefficients D, as well as the anomaly parameters $\alpha_i$ of components i=1, 2. In the case of CCFs, the pixel displacement is taken into consideration with the second exponential term including the pixel size δ and the pixel indices $x_1$, $x_2$, $y_2$, ... whereas for ACFs, that term is one. For 1D- and 2D-FCS data of fluorescent beads and Alexa488, curve fitting can done without any blinking contribution, i.e., Θ=0. For confocal and 1D-FCS data of green fluorescent proteins, the non-fluorescent lifetime can be assumed to be 100 µs. For 2D-FCS data, a time resolution of 0.7 ms allows to neglect the blinking contribution, i.e., Θ=0. For single component fits, $f_1=1$ is set. The goodness of the fit can be assessed by means of the R-square ($R_{adj}^2$) adjusted to the degrees of freedom with $0 \le R_{adj}^2 \le 1$. It can be useful to accepted fits with $R_{adj}^2 \ge 0.8$ or higher.

In this way, profiles (1D-FCS) and maps (2D-FCS) of the fit parameters, of the goodness of fit $R_{adj}^2$ and of the pixel intensity can be created. By thresholding the intensity and/or $R_{adj}^2$ maps, binary masks can be generated in order to exclude noisy data and/or unsatisfactory fits and to pick those regions, for which the finally resulting concentrations, diffusion coefficients and fractions of components are mapped.

Example 1

Figure 7:
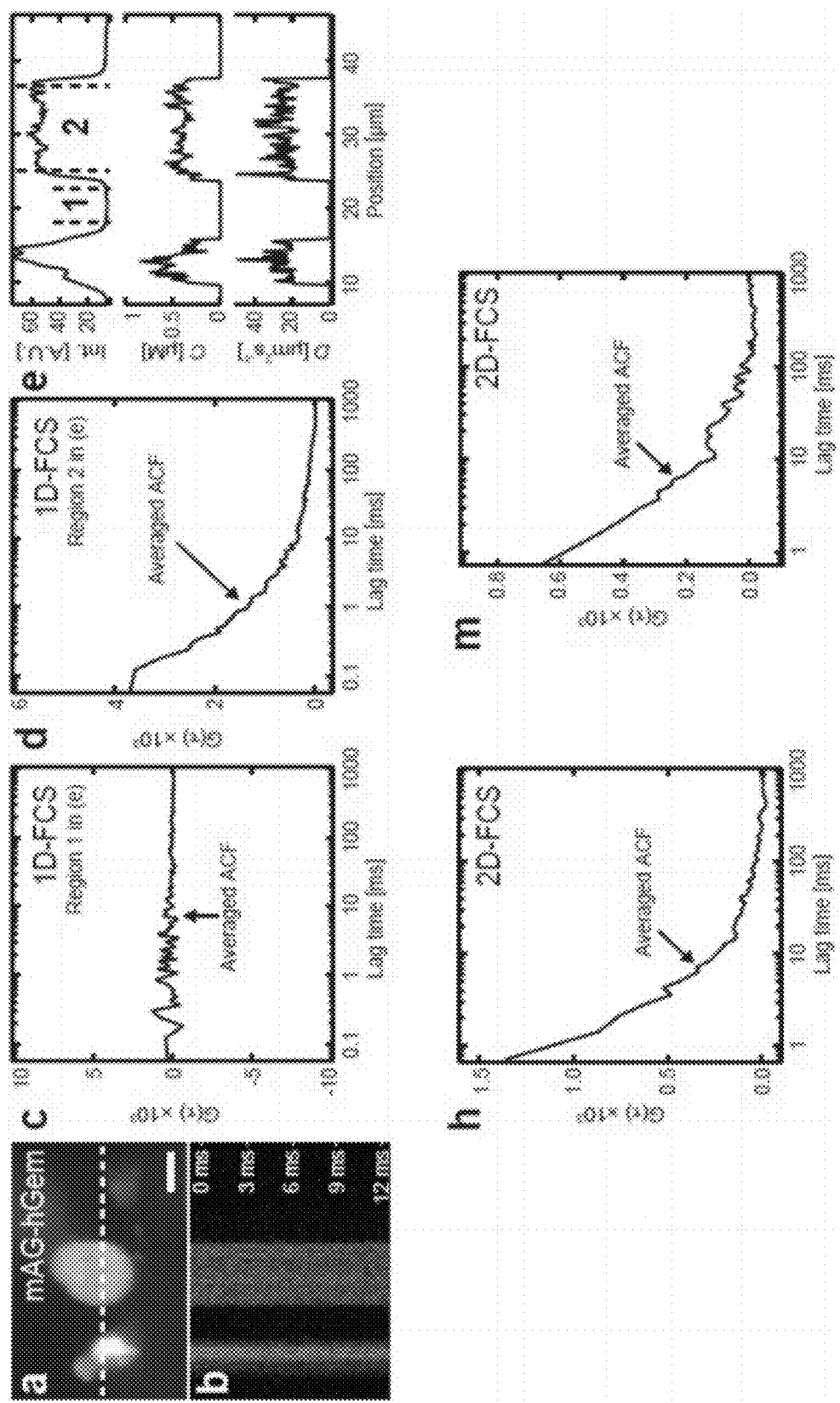
FIGS. 7a-7e, 7h and 7m show results of FCS imaging of protein concentration and mobility inside a MDCK cell and a wing imaginal disk from a Drosophila larva recorded with the light pad microscope.

FCS measurements inside living specimen, such as cells, are particularly challenging because of the heterogeneous interior of the cells and the limited number of fluorescent-labelled molecules. We investigated the usability of FCS imaging in vivo by measuring the diffusion of an endogeneously expressed green fluorescent protein-tagged protein, the 40 kDa mAG-hGem (1/110) component of the cell cycle reporter system Fucci [14, 15] in MDCK cells in S/G2 phase of the cell cycle (FIG. 7a). FCS recordings with one line of the EM-CCD (1D-FCS, FIG. 7b) allowed to calculate autocorrelation functions (ACFs) that featured a diffusion-induced decay in the area of the nucleus, where the mAG-hGem protein localizes (FIG. 7c). In contrast, non-correlating ACFs were obtained from cytoplasmic areas and the intracellular space (FIG. 7d). Fitting the ACFs with a one-component anomalous diffusion model function (as explained above) yielded an average apparent diffusion coefficient of $25\pm7$ $\mu m^2 s^{-1}$ and a concentration of the protein for this specific cell of $420\pm120$ nM (FIG. 7e). Confocal FCS measurements performed using other cells from the same cell line validated the diffusion coefficient ($20\pm3$ $\mu m^2 s^{-1}$; FIG. 6a-b). 2D-FCS recordings of a $15\times10^2$ pixel area corresponding to $\sim3\times19$ $\mu m^2$ across a cell nucleus revealed a rather homogenous distribution of diffusion coefficients and concentrations, as expected, with very similar average values (FIG. 7h) for this and other cells studied. We noticed that the slower acquisition speed associated with 2D-FCS recordings affected mostly the precision of estimating properly the concentration. When comparing a time resolution of 1μs to 40, 700 or 1400 μs, the confidence interval from the fit increased 1.5-, 3- or 5-fold, in case of a diffusion correlation time of 3 ms (as typically observed for GFP). In contrast, the estimation of the diffusion coefficient remained almost unaffected. These data validate that 1D- and 2D-FCS recordings enable the retrieval of diffusion coefficients from living cells with good accuracy. Measurements of protein concentrations are less reliable when using 2D-FCS recordings, however, this information can be approximated from the signal intensity, and it is a less relevant parameter in all the cases where transient transfection systems are used due to cell-to-cell variations in the expression of the protein. The accuracy of protein concentration measurements can be improved by a better time sampling of the 2D-FCS acquisition using next generations of detector arrays (for instance sCMOS camera).

Figure 8:
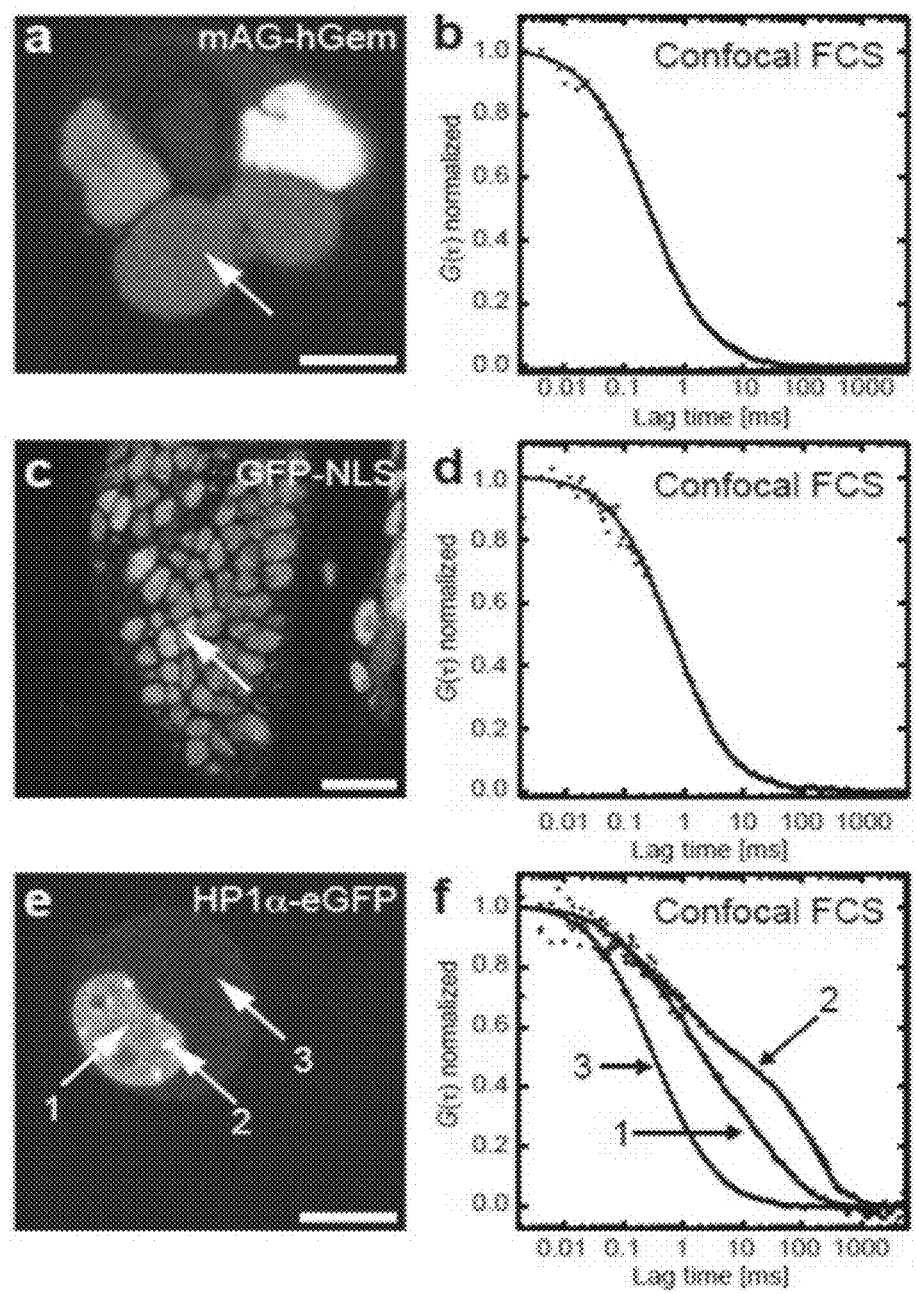
FIGS. 8a to 8f show in vivo confocal FCS measurement for comparison.

To investigate whether it is possible to use the light-pad microscope to study protein diffusion in cells in entire tissues, we investigated the diffusion of NLS-GFP (GFP fused to a nuclear localisation signal, NLS) in wing imaginal disks of Drosophila larvae. A 3D reconstruction of a large area of the tissue generated by scanning it horizontally through the light-pad, revealed (sub-)cellular structures up to a depth of ~50 μm. FCS imaging performed in a selected area of a freshly prepared wing disk provided the diffusion coefficient of NLS-GFP inside the nuclei (FIG. 7m, FIG. 9a), amounting to an average of $19\pm6$ $\mu m^2 s^{-1}$. The value was consistent with measurements performed using confocal FCS ($14\pm2$ $\mu m^2 s^{-1}$, FIG. 8c-d). This demonstrates that the light-pad microscope can be used to study the diffusion of fluorescently-labeled proteins inside embryonic tissues.

Example 2

Figure 9:
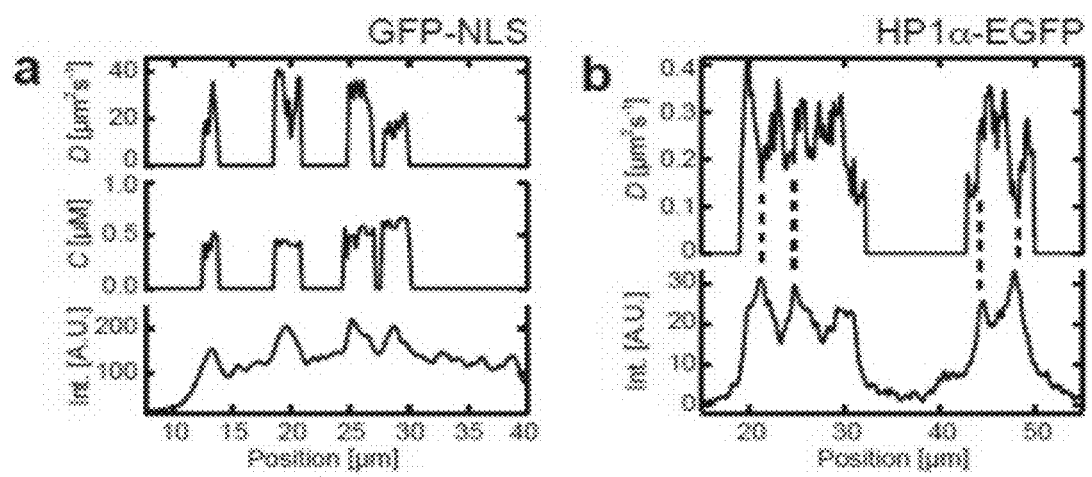
FIGS. 9a to 9b show 1D-FCS measurements on Wing imaginal disk from Drosophila larva and 3T3 cells.

Members of the heterochromatin protein 1 (HP1) family undergo dynamic interactions with DNA and with specifically modified chromatin-binding and -forming proteins, in particular Lys9-di- or tri-methylated nucleosomal histone H3 as well as a broad range of factors involved in genome homeostasis, thus playing complex functions in heterochromatin establishment and maintenance, euchromatin organization, transcriptional repression, DNA replication and DNA damage repair. The dynamics of HP1 interactions with DNA were measured previously by photobleaching and confocal FCS demonstrating that heterochromatin is accessible to regulatory factors and that HP1α enrichment in heterochromatin is due to an increased but still very dynamic interaction of the protein with chromatin, in particular with methylated nucleosomal histone H3. Local measurements by confocal FRAP (fluorescence relaxation after photobleaching) or FCS were guided by the brightness of the HP1α staining, which is strong in heterochromatin, and were limited to a few measurements per cell. Therefore, such investigations did not reveal whether the rather uniform intensity of the euchromatin staining of HP1α, which comprises the larger fraction of the nuclear volume, is associated with a uniform mobility. Here, a 1D-FCS recording (FIG. 9b) in murine 3T3 cells expressing full length HP1α revealed areas with a fast and a slowly diffusing component of HP1α mobility. The measured values of the slow component (between 0.07 $\mu m^2 s^{-1}$ and 0.41 $\mu m^2 s^{-1}$, consistent with confocal FCS data, FIG. 8e-f) exhibited a partial anticorrelation to the fluorescence intensity distribution (FIG. 9b). However, the spatial resolution and dimensionality of the 1D-FCS recordings was not sufficient to clearly distinguish eu- and heterochromatin.

Figure 10:
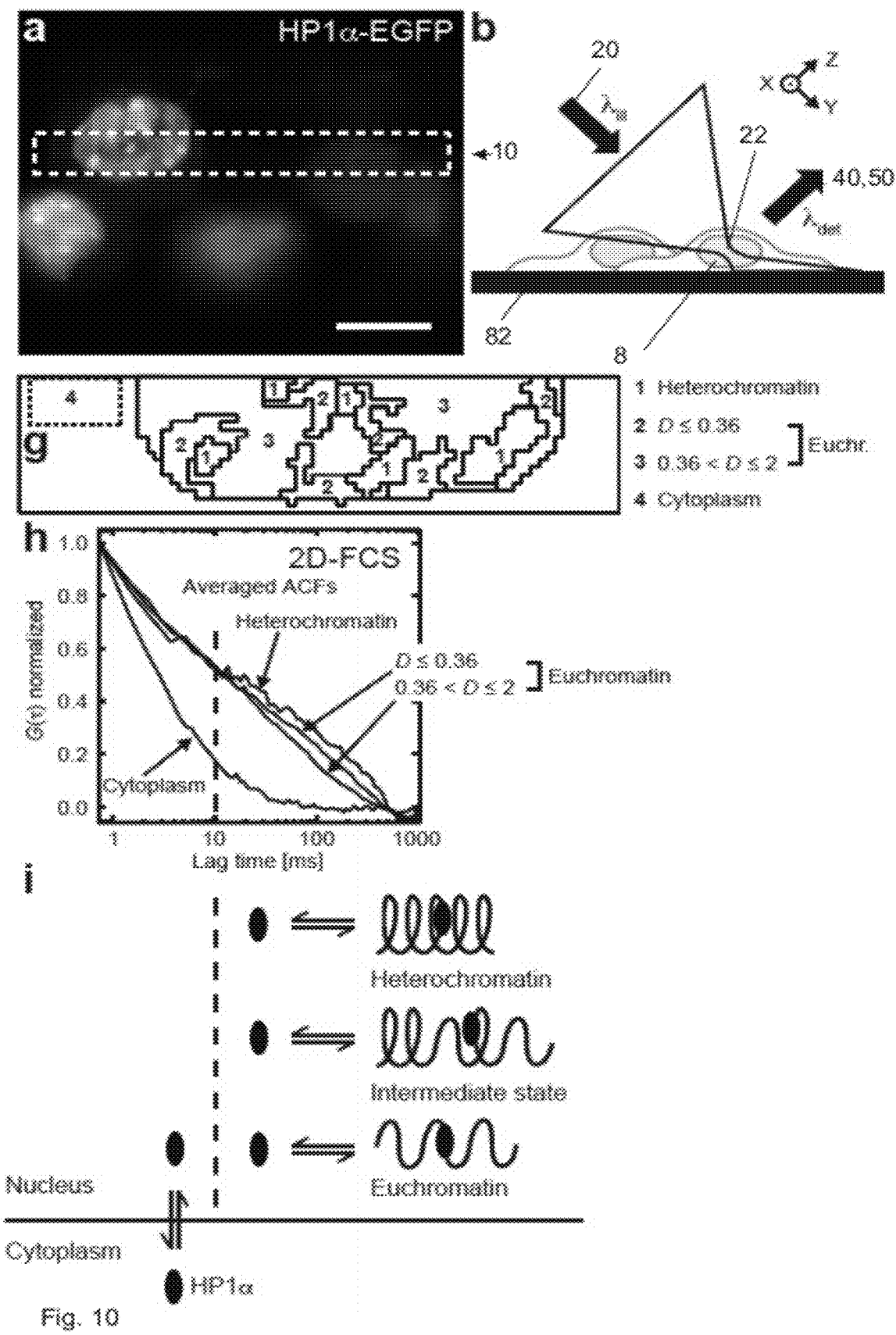
FIGS. 10a, 10b, 10g, 10h and 10i shows spatially resolved analysis of HP1α mobility in 3T3 cells by FCS imaging.

FIG. 10 shows spatially resolved analysis of HP1α mobility in 3T3 cells by FCS imaging. FIG. 10a is an overview of 3T3 cells expressing HP1α-EGFP. The dashed rectangle indicates the light-pad 10 area and the scale bar corresponds to 10 μm. FIG. 10b is schematic illustration of the illumination and observation of cells as samples 8 in a Petri dish 82. The high aperture angle of the illumination light-sheet 22 (74°) leads to weak illumination of cells lying outside the light-pad 10 area. Optical sectioning is performed under 45° with respect to the bottom of the Petri dish 82. Segmentation based on intensity thresholds was used to delimitate eu- and heterochromatin areas as well as the cytoplasm. Additional segmentation based on a diffusion coefficient threshold at $D=0.36$ $\mu m^2 s^{-1}$ (mean value plus one standard deviation of the distribution of diffusion coefficients in heterochromatin) was applied to FIG. 8e to identify regions in euchromatin differing in the mean apparent diffusion coefficient of HP1α. The scale bar corresponds to 1 μm. FIG. 10h shows ACFs calculated and averaged for the four different regions highlighted in the segmentation map of FIG. 10g. FIG. 10i shows a schematic model of HP1α mobility resulting from diffusion and chromatin binding in 3T3 cells. A first fraction is diffusing freely (fast component in the ACFs) in cytoplasm and nucleus. A slow chromatin-interacting fraction is only found in the nucleus (slow component in the ACFs) with a slower apparent diffusion coefficient in heterochromatin than in euchromatin, resulting from a higher affinity to chromatin in hetero-compared to euchromatin. However, in some parts of the euchromatin the HP1α mobility (and thus the chromatin affinity) is similar to heterochromatin. This corroborates the emerging role of HP1α as an important factor in euchromatin related processes.

The spatially better resolved investigation of the HP1α mobility using 2D-FCS recording revealed a diffusion coefficient of 10-40 $\mu m^2 s^{-1}$ in the cytoplasm. In the nucleus, a two-component fit yielded for the slow fraction 0.29±0.07 $\mu m^2 s^{-1}$ in high-intensity heterochromatin and a broad distribution of 0.48±0.25 $\mu m^2 s^{-1}$ in the low-intensity euchromatin areas. We subdivided the euchromatin into regions with apparent diffusion coefficients below and above a threshold of 0.36 $\mu m^2 s^{-1}$ (the mean value plus one standard deviation of the distribution in heterochromatin). This analysis indicated bona fide euchromatin regions with an HP1α mobility of 0.29±0.05 $\mu m^2 s^{-1}$ that corresponded very well to the one observed in heterochromatin regions (see above). However, the relative amount of chromatin-bound HP1α was smaller, as indicated by the lower amplitude of the curve. The remaining euchromatin exhibited a higher diffusion coefficient of 0.61±0.26 $\mu m^2 s^{-1}$ (FIG. 10g-h). This demonstrates that FCS imaging has the potential to provide new insights into the spatial organization of cellular structures and how protein abundance and mobility correlate with each other.

3T3 cells stably expressing HP1α-EGFP were cultivated as known in the art. For confocal imaging and FCS measurements, cells were grown in 8-well chambered cover glasses and the medium was replaced by phenol red-free medium before the experiments. For light-pad imaging and 1D-/2D-FCS measurements, cells were grown on pieces of 1 mm thick cover slide glass smaller than 4×10 $mm^2$, which were transferred to Petri dishes containing 1×PBS before the experiments.

Final Remarks

It should be understood that the above examples are purely illustrative and show examples how the light-pad microscope can be used or tested. The application as defined by the claims is not limited to a specific example or application. Many other applications of the light-pad microscope are possible and a person skilled in the art will find many different biological and non-biological samples that can be investigated with the light-pad microscope. Other method for data evaluation may also be used with the light-pad microscope.

REFERENCES

1. E. L. Elson, and D. Magde, "Fluorescence correlation spectroscopy. I Conceptual basis and theory," Biopolymers 13, 1-27 (1974).
2. S. A. Kim, K. G. Heinze, and P. Schwille, "Fluorescence correlation spectroscopy in living cells," Nature Methods 4, 963-973 (2007).
3. Handbook of Biological Confocal Microscopy (Springer, Heidelberg, 2006).
4. C. I. Maeder, M. A. Hink, A. Kinkhabwala, R. Mayr, P. I. Bastiaens, and M. Knop, "Spatial regulation of Fus3 MAP kinase activity through a reaction-diffusion mechanism in yeast pheromone signalling," Nature Cell Biology 9, 1319-1326 (2007).
5. B. D. Slaughter, J. W. Schwartz, and R. Li, "Mapping dynamic protein interactions in MAP kinase signaling using live-cell fluorescence fluctuation spectroscopy and imaging," Proceedings of the National Academy of Sciences of the USA 104, 20320-20325 (2007).
6. U. Schmidt, K. B. Im, C. Benzing, S. Janjetovic, K. Rippe, P. Lichter, and M. Wachsmuth, "Assembly and mobility of exon-exon junction complexes in living cells," RNA 15, 862-876 (2009).
7. M. Huranova, I. Ivani, A. Benda, I. Poser, Y. Brody, M. H of, Y. Shav-Tal, K. M. Neugebauer, and D. Stanek, "The differential interaction of snRNPs with pre-mRNA reveals splicing kinetics in living cells," Journal of Cell Biology 191, 75-86 (2010).
8. S. R. Yu, M. Burkhardt, M. Nowak, J. Ries, Z. Petrasek, S. Scholpp, P. Schwille, and M. Brand, "Fgf8 morphogen gradient forms by a source-sink mechanism with freely diffusing molecules," Nature 461, 533-U100 (2009).
9. E. H. K. Stelzer, "Light sheet based fluorescence microscopes (LSFM, SPLM, DSLM) reduce phototoxic effects by several orders of magnitude," Mechanims of Development 126, S36-S36 (2009).
10. M. Wachsmuth, W. Waldeck, and J. Langowski, "Anomalous diffusion of fluorescent probes inside living cell nuclei investigated by spatially-resolved fluorescence correlation spectroscopy," Journal of Molecular Biology 298, 677-689 (2000).
11. M. Weiss, "Probing the interior of living cells with fluorescence correlation spectroscopy," Annals of the New York Academy of Science 1130, 21-27 (2008).
12. CRC Handbook of Chemistry and Physics (CRC Press, Boca Raton, 2008).
13. K. Luby-Phelps, S. Mujumdar, R. B. Mujumdar, L. A. Ernst, W. Galbraith, and A. S. Waggoner, "A novel fluorescence ratiometric method confirms the low solvent viscosity of the cytoplasm," Biophysical Journal 65, 236-242 (1993).
14. A. Sakaue-Sawano, H. Kurokawa, T. Morimura, A. Hanyu, H. Hama, H. Osawa, S. Kashiwagi, K. Fukami, T. Miyata, H. Miyoshi, T. Imamura, M. Ogawa, H. Masai, and A. Miyawaki, "Visualizing spatiotemporal dynamics of multicellular cell-cycle progression," Cell 132, 487-498 (2008).
15. M. Sugiyama, A. Sakaue-Sawano, T. Iimura, K. Fukami, T. Kitaguchi, K. Kawakami, H. Okamoto, S. Higashijima, and A. Miyawaki, "Illuminating cell-cycle progression in the developing zebrafish embryo," Proceedings of the National Academy of Sciences of the USA 106, 20812-20817 (2009).

What is claimed is:

1. A microscope having an illumination light path for illuminating with an illumination light beam a sample through an illumination objective lens and at least one viewing light path for viewing the sample through a detection objective lens, the microscope comprising a tube lens, arranged in the illumination light path, in front of the illumination objective lens, an illumination light path focussing arrangement in the illumination light path in front of the tube lens, the illumination light path focussing arrangement including a cylindrical lens, which focusses the illumination light beam in one direction and leaves the illumination light beam unchanged in another direction transverse to the one direction, thus defining, at the intersection of the illumination light path and the detection light path, a substantially two-dimensional object illumination region extending along an illumination direction of the illumination light path and the other direction, and an illumination region-confining device in the illumination light path arranged between the cylindrical lens and the illumination objective lens and for selectively illuminating a portion of the substantially two-dimensional object illumination region, the illumination region-confining device comprising a width confining slit and a length confining slit, the length confining slit being arranged between the tube lens and the illumination objective lens, wherein the portion of the substantially two-dimensional object illumination region is confined at least in the illumination direction and the other direction.

2. The microscope of claim 1, wherein the illumination light path focussing arrangement further comprises at least one of (i) an anamorphically shaped lens, or (ii) a one-dimensional array of spherical or of aspherical lenses.

3. The microscope of claim 1, wherein the illumination region-confining device comprises a light beam shaper.

4. The microscope of claim 1, wherein a viewing direction of the at least one viewing light path is substantially perpendicular to the illumination direction and to the substantially two-dimensional object illumination region.

5. The microscope of claim 1, further comprising an adjustable detection aperture in a detection path that allows to reduce an effectively viewed region in one or two dimensions.

6. The microscope of claim 5, wherein the portion of the substantially two-dimensional object illumination region and the effectively viewed region are congruent and/or coincident.

7. The microscope of claim 6, wherein the portion of the substantially two-dimensional object illumination region and the effectively viewed region are congruently and/or coincidently moveable through the sample.

8. The microscope of claim 1, further comprising an additional objective lens for at least one of illumination or viewing of a sample arranged in a substantially two-dimensional object illumination region.

9. The microscope of claim 8, wherein the additional objective lens is part of an epifluorescence microscope.

10. The microscope of claim 8, wherein the microscope further comprises an inverted microscope and the additional objective lens is part of the inverted microscope.

11. The microscope of claim 1, wherein the illumination region-confining device further comprises a scanning unit.

12. A method for detecting a sample, the method comprising:
Illuminating, by passing an illumination light beam through a tube lens and subsequently an illumination objective lens, a two-dimensional portion of a sample by focussing, with a cylindrical lens, the illumination light beam in one direction and leaving the illumination light beam unchanged in another direction transverse to the first direction, thus defining, at the intersection of the illumination light path and the detection light path, a substantially two- dimensional object illumination region extending in an illumination direction of the illumination light beam and in the other direction;
wherein illuminating the two-dimensional portion further comprises confining the substantially two-dimensional object illumination region, by an illumination region confining device in the illumination path arranged between the cylindrical lens and the illumination objective lens, for selectively illuminating a portion of the substantially two-dimensional object illumination region, the illumination region-confining device comprising a width confining slit and a length confining slit, the length confining slit being arranged between the tube lens and the illumination objective lens, wherein the portion of the substantially two-dimensional object illumination region is confined in the illumination direction and the other direction.

13. The method of claim 12, further comprising viewing the substantially two- dimensional object illumination region in a viewing direction, the viewing direction being substantially perpendicular to the illumination direction.

14. The method of claim 12, further comprising moving at least one of the substantially two-dimensional object illumination region or the portion of the substantially two-dimensional object illumination region through the sample.

15. The method of claim 12, further comprising measuring a signal fluctuation in the portion of the substantially two-dimensional object illumination region.

16. The method of claim 12, further comprising measuring a fluorescence intensity contrast for alignment.

* * * * *

UNITED STATES PATENT AND TRADEMARK OFFICE
CERTIFICATE OF CORRECTION

PATENT NO. : 10,908,403 B2
APPLICATION NO. : 13/371991
DATED : February 2, 2021
INVENTOR(S) : Michael Knop et al.

It is certified that error appears in the above-identified patent and that said Letters Patent is hereby corrected as shown below:

In the Specification

Column 8, Lines 64-65, "Conventional" should be -- conventional --.

Column 16, Lines 5-6, "M. H of" should be -- M. Hof --.

Column 16, Line 15, "SPLM" should be -- SPIM --.

Signed and Sealed this
Fifteenth Day of June, 2021

Drew Hirshfeld
*Performing the Functions and Duties of the
Under Secretary of Commerce for Intellectual Property and
Director of the United States Patent and Trademark Office*